United States Patent Office 3,356,411
Patented Dec. 5, 1967

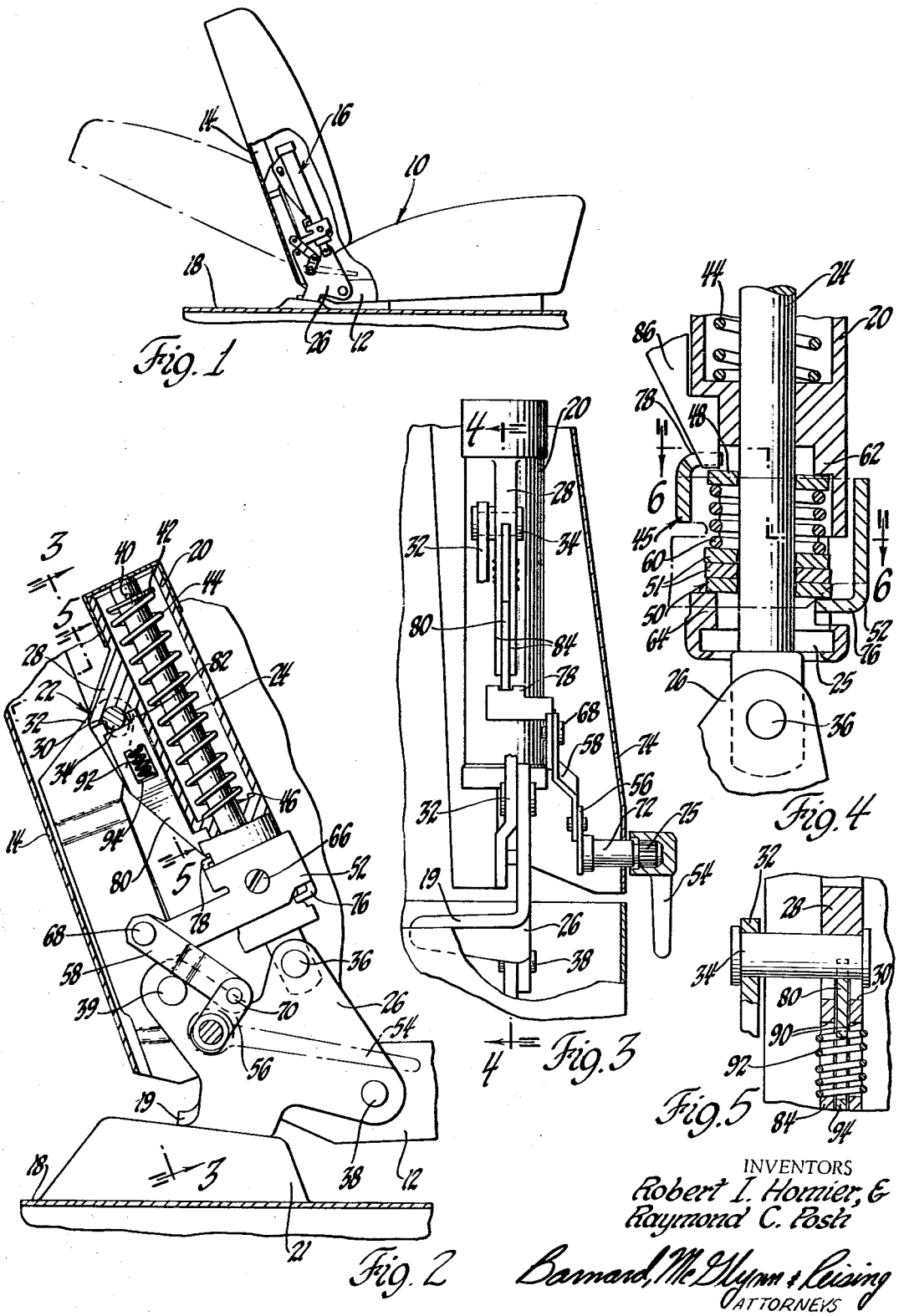

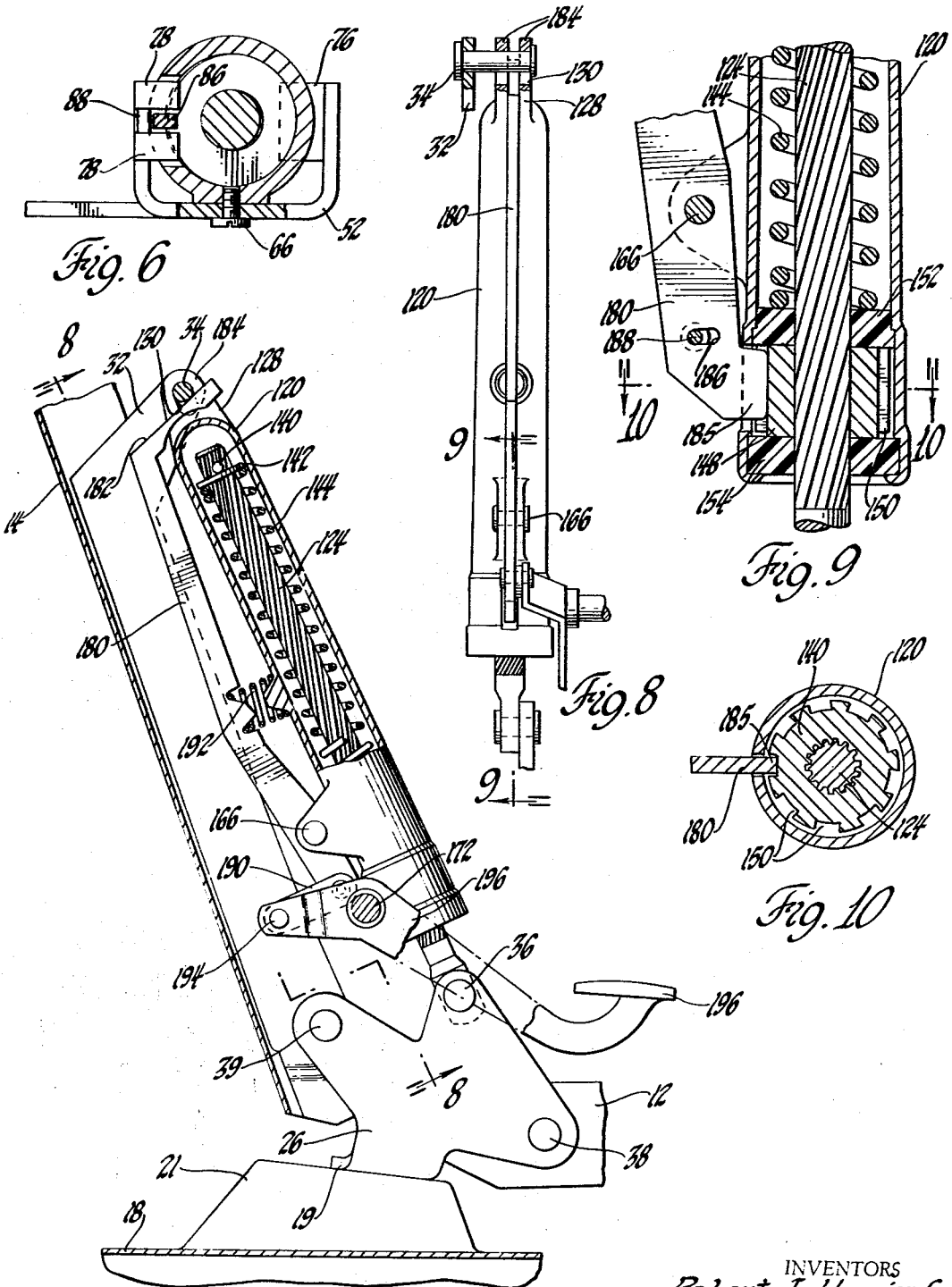

3,356,411
SEAT BACK POSITIONING MECHANISM
Robert I. Homier, Farmington, and Raymond C. Posh, Livonia, Mich., assignors, by mesne assignments, to Lear Siegler, Inc., Santa Monica, Calif., a corporation of Delaware
Filed Feb. 18, 1965, Ser. No. 433,722
23 Claims. (Cl. 297—355)

ABSTRACT OF THE DISCLOSURE

A seat assembly including a seat frame with a seat back frame operatively connected to the seat frame for pivotal movement relative thereto between an upright seat-forming position and various reclined positions, and more particularly, to a positioning mechanism for controlling the pivotal movement of the seat back frame including a manually actuatable control means for selectively allowing relative movement between the seat back frame and the seat frame, and release means engageable with the seat back frame and operable with the control means for allowing the seat back frame to be moved from a reclined position toward the upright seat-forming position without manual actuation of the control means which is normally utilized to position the seat back frame by an individual sitting in the seat.

Seat assemblies heretofore utilized frequently include a seat back frame operably connected to a seat frame for pivotal movement relative thereto. Normally, the desired reclined position of the seat back frame is attained by a positioning mechanism interconnecting the seat frame with the seat back frame and manually operated to allow relative pivotal movement between the seat frame and the seat back frame. Such a positioning mechanism usually positively secures the seat back frame in a selected reclined position and upon manual actuation thereof allows relative pivotal movement between the seat frame and the seat back frame.

The positioning mechanisms which have heretofore been utilized normally must be manually actuated in order to move the seat back frame from a reclined position toward the upright seat-forming position. The lever or the like which is attached to the positioning mechanism is usually positioned relative to the seat so that it is readily accessible by an individual sitting in the seat. Therefore, if an individual is behind the seat and wishes the seat back frame to be moved from a reclined position toward the upright seat-forming position, he must move himself to a position beside the seat in order to reach the manual lever, or the like, to actuate the positioning mechanism in order to move the seat back frame toward the upright seat-forming position.

Accordingly, it is an object and feature of the present invention to provide an improved positioning mechanism suitable for use with a seat assembly having a reclining seat back frame so that an individual behind the seat assembly may push the seat back frame to move the seat back frame toward the upright seat-forming position without actuating the manual lever which is normally utilized to position the seat back frame.

Another object and feature of the present invention is to provide a positioning mechanism suitable for use with a seat assembly having a reclining seat back frame including a first means adapted for a lost motion connection to the seat back frame, a second means movable relative to the first means and operably connected to the seat frame for pivotal movement relative thereto, control means interconnecting the first and second means for selectively allowing relative movement therebetween to allow relative movement between the seat back frame and the seat frame, and release means engageable with the seat back frame and operable with the control means upon movement allowed by the lost motion connection of the seat back frame in an upright seat-forming direction.

A further object and feature of the present invention is to provide a seat assembly having a seat frame and a seat back frame operatively connected to the seat frame for pivotal movement relative thereto between an upright seat-forming position and various reclined positions and including a housing having a flange with an elongated aperture therein, a pin attached to the seat back frame and disposed for sliding and rotary movement in the aperture to allow a predetermined amount of relative movement between the housing and the seat back frame, a rod disposed for movement in and out of the housing and operably connected at a first end thereof to the seat frame, control means operatively mounted in the housing and movable along the rod for selectively allowing the housing to move relative to the rod, and release means movably mounted on the housing and biased into engagement with the pin and operable with the control means to allow movement of the housing relative to the rod upon relative movement between the seat back frame and the housing.

In general, these and other objects may be accomplished by various embodiments of a positioning mechanism constructed in accordance with the invention. Generically, there is included a seat frame having a seat back frame operatively connected thereto for pivotal movement between an upright seat-forming position and various reclined positions. A housing is included and has an elongated aperture therethrough. A pin is attached to the seat back frame and is adapted for sliding and rotary movement in the aperture. A rod is disposed for movement in and out of the housing and is operatively connected at a first end thereof to the seat frame for pivotal movement relative thereto. A biasing means is disposed between the second end of the rod and the housing to urge the rod into the housing. There is also included a control means interconnecting the housing and the rod for selectively allowing movement between the housing and the rod. Also included is a release means movably mounted on the housing and normally engaging the pin and operable with the control means so that upon relative movement between the seat back frame and the housing, the pin will move along the aperture to move the release means to allow the housing to move relative to the rod which in turn allows the seat back frame to be moved from a reclined position toward the upright seat-forming position. In a first preferred embodiment of the present invention, the control means includes a first disc pack comprising at least one disc normally in frictional engagement with the rod for preventing movement of the housing relative to the rod in a first direction, and a second disc pack comprising of least one disc normally in frictional engagement with the rod for preventing movement of the housing relative to the rod in a second direction. A biasing means is disposed between the first and second disc packs to urge the disc packs into frictional engagement with the rod. Also included in the control means is a manually actuated means pivotally connected to the housing for selective movement to engage the first and second disc packs to move the disc packs out of frictional engagement with the rod to allow the housing to move relative to the rod. The release means normally engages the pin and is engageable with the first disc pack upon relative movement between the seat back frame and the housing to move the pin along the aperture so that upon a predetermined amount of movement of the seat back frame toward the upright seat-forming position the release means engages the first disc pack to allow the housing to move relative to the rod thereby to allow the seat back frame to be moved from a reclined position toward the upright seat-forming position. In another preferred embodiment of the present invention, the control means includes a nut rotatably mounted in the housing and in threaded engagement with the rod. The nut has a series of notches disposed circumferentially thereabout. An arm is pivotally attached to the housing and has a cam surface engageable with the pin and a flange which is insertable into the notches of the nut. A biasing means is disposed between the housing and the arm to urge the cam surface into engagement with the pin and the flange into one of the notches. Upon relative movement between the seat back frame and the housing, the pin will engage the cam surface of the arm to pivot the arm and withdraw the flange from the notch to allow the nut to rotate on the rod which in turn allows the seat back frame to move from a reclined position toward the upright seat-forming position. For manual control, a linkage means is connected to the arm to pivot the arm so that the flange is withdrawn from the notch on the nut. The linkage means is connected to the arm through a lost motion connection so that the linkage remains stationary when the arm is being pivoted by movement of the seat back frame which forces the pin against the cam surface.

Other objects and attendant advantages of this invention will be readily appreciated as the same becomes better understood by reference to the following detailed description when considered in conjunction with the accompanying drawings wherein:

FIGURE 1 is an elevational view partly broken away of a seat assembly utilizing a preferred embodiment of the positioning mechanism of the instant invention with the seat back frame shown in phantom in a reclined position;

FIGURE 2 is an enlarged fragmentary view of the seat assembly of FIGURE 1 with the positioning mechanism shown partly in cross section;

FIGURE 3 is a cross-sectional view taken substantially along line 3—3 of FIGURE 2;

FIGURE 4 is an enlarged cross-sectional view of a portion of the device shown in FIGURE 3 taken substantially along line 4—4;

FIGURE 5 is an enlarged cross-sectional view of a portion of the device shown in FIGURE 2 taken substantially along line 5—5;

FIGURE 6 is a cross-sectional view taken substantially along line 6—6 of FIGURE 4;

FIGURE 7 is an elevational view of a portion of the seat assembly shown in FIGURE 1 with another preferred embodiment of the positioning mechanism shown partly in cross section;

FIGURE 8 is a view taken substantially along the 3—3 of FIGURE 7;

FIGURE 9 is an enlarged cross-sectional view of a portion of the device shown in FIGURE 8 taken substantially along line 9—9; and FIGURE 10 is a cross-sectional view taken substantially along line 10—10 of FIGURE 9.

Referring now to the drawings wherein like numerals indicate like or corresponding parts throughout the several views, there is shown generally at 10 a seat assembly including a seat frame 12 with a seat back frame 14 operably connected to the seat frame 12 for pivotal movement relative thereto between an upright seat-forming position, shown in solid lines, and various reclined positions, one of which is shown in phantom. The seat assembly also includes a positioning mechanism, generally shown at 16, for determining the pivotal movement of the seat back frame 14 relative to the seat frame 12. As illustrated, the seat back frame 14 is pivotally connected to an intermediate frame 26, which is in turn pivotally connected to the seat frame 12, however, it is clear that the seat back frame may also be pivotally connected directly to the seat frame. The seat assembly 10, shown in FIGURE 1, may be mounted on the floor 18 of a vehicle such as an automobile or bus. The intermediate frame 26 has a stop portion 19 which rests against the support member 21. The seat back frame 14 may be moved to a forwardly folded rear entry position by pivoting the intermediate frame 26 relative to the seat frame 12, which in turn lifts the stop portion 19 off of the support member 21.

One preferred embodiment of the positioning mechanism utilized in the seat assembly is shown in FIGURES 2 through 6. The positioning mechanism includes a first means such as the housing 20 pivotally connected to the seat back frame 14 through a lost motion connection, generally shown at 22, and a second means such as the rod 24 movable relative to the housing 20 and pivotally connected to the seat frame 12 through the intermediate frame 26.

The housing 20 has a bifurcated flange 28. The bifurcated flange 28 has an elongated aperture 30 therethrough. A structural member 32 forms a part of the seat back frame 14 by being welded or brazed thereto and supports a pin 34 which is disposed in the aperture 30 for sliding and rotary movement therein so as to provide a lost motion connection between the seat back frame 14 and the housing 20 thereby to allow a predetermined amount of relative movement therebetween.

The rod 24 is disposed for movement in and out of the housing 20 and is pivotally connected at a first end thereof to the intermediate frame 26 by the rivet 36. The seat back frame 14 is pivotally connected to the intermediate frame 26 by the rivet 39. The intermediate frame 26 is pivotally connected by the rivet 38 to the seat frame 12 so that the seat back frame 14 may be moved to a forwardly folded rear entry position without relative movement between the housing 20 and the rod 24. A pin or bolt 40 extends through the rod 24 adjacent the second end thereof to retain the washer 42 on the rod 24. A biasing means comprising the spring 44 is disposed between the washer 42 and a shoulder portion 46 of the housing 20. A bearing element 25 is disposed in the housing 20 and slides along the rod 24.

A control means, generally shown at 45, is operatively mounted in the housing 20 and is selectively movable along the rod 24 for allowing the housing 20 to move relative to the rod 24. The control means 45 includes friction means comprising the disc 48 and the disc pack 50, and means comprising the flange member 52 pivotally connected to the housing 20 for selective movment by the handle 54 and links 56 and 58 to engage the disc 48 and the disc pack 50. The disc pack 50 comprising the discs 51 is normally in frictional engagement with the rod 24 to prevent movement of the rod 24 into the housing 20 as urged by the spring 44. The disc 48 is normally in frictional engagement with the rod 24 for preventing movement of the housing 20 relative to the rod 24 in a direction where the rod 24 is pulled out of the housing 20 against the action of the spring 44. Although only one disc 48 is illustrated to prevent relative movement between the housing 20 and the rod 24 in one direction while a plurality of discs 51 are utilized to prevent relative movement between the housing 20 and the rod 24 in the opposite direction, it is obvious that any number of discs may be utilized to prevent relative movement between the housing 20 and the rod 24 in either direction.

A biasing means comprising the spring 60 is disposed between the disc 48 and the disc pack 50 to urge the respective discs into frictional engagement with the rod 24. The disc 48 is in engagement with the shoulder 62 of the housing 20 on one side of the rod 24 while the lowermost disc 51 of the disc pack 50 engages the shoulder 64 of the housing 20 on the opposite side of the rod 24. The disc 48, therefore, pivots about its contact with the shoulder 62 and the disc pack 50 pivots about its contact with the shoulder 64. As will be evident from FIGURE 4, the respective discs are urged into frictional engagement with the rod 24 by the spring 60 such that relative movement is prevented between the rod 24 and the housing 20; however, when the disc 48 is pivoted about the shoulder 62 to a position transverse the rod 24, the rod 24 is free to move into the housing 20. Also, if the discs 51 of the disc pack 50 are pivoted about the shoulder 64 so as to be disposed transverse the rod 24, the rod 24 is free to move out of the housing 20 against the action of the spring 44.

The flanged element 52 is pivotally connected to the housing 20 by an appropriate means such as the bolt 66. The flanged member 52 is pivotally connected to the link 58 by the rivet 68. The link 58 is pivotally connected to the link 56 by the rivet 70. A shaft 72 is rotatably supported in a portion of the structure 74 of the seat assembly. The link 56 is fixed to the shaft 72 so that as the shaft 72 is rotated the link 56 moves the link 58. The handle 54 is connected to the end of the shaft 72 by the spline connection 75. The flanged element 52 has a lower flange 76 and an upper flange 78. Upon movement of the handle 54, the flanged element 52 is pivoted so that the flange 78 engages the disc 48 to move the disc to a position transverse to the rod 24, and at the same time, the flange 76 engages the disc pack 50 to move the discs 51 to a position transverse to the rod 24. Once all the discs are transverse the rod 24, the rod 24 is free to move in either direction relative to the housing 20. Normally, the seat back frame 14 of the seat assembly 10 is moved between various reclined positions and the upright seat-forming position by an individual sitting in the seat and manually operating the handle 54.

However, the seat back frame 14 of the seat assembly may be moved from a reclined position toward the upright seat-forming position without actuating the manual lever 54. To accomplish this, a release means comprising the plate 80 is movably mounted on the housing 20 to engage the disc 48 to move the disc 48 to a position transverse to the rod 24 so that the rod 24 may be moved into the housing 20. The plate 80 is retained between the two wings 84 of the bifurcated flange 28 by means of a lip 82 and a tongue 86 which is disposed in a slot 88 in the flange 78. The wings 84 of the bifurcated flange 28 have an aperture 90 therein to accommodate a biasing means comprising the spring 92. The plate 80 also has an aperture 94 for receiving the spring 92. The spring 92 acts between the wings 84 and the plate 80 to urge the plate 80 into contact with the pin 34.

In operation of the embodiment shown in FIGURES 2 through 6, the seat back frame 14 may be pivoted a predetermined amount about the rivet 39 as allowed by the movement of the pin 34 in the aperture 30, without moving the rod 24 relative to the housing 20, so that the plate 80 is moved to contact the disc 48 to move the disc 48 into a position transverse the rod 24. Once the disc 48 is transverse the rod 24, the rod 24 is free to move into the housing 20 thereby allowing the seat back frame 14 to pivot relative to the seat frame 12 from a reclined position toward the upright seat-forming position. Thus, the seat back frame may be moved from a reclined position toward the upright seat-forming position without actuating the control means by the handle 54.

Referring now to FIGURES 7 through 10, there is shown another preferred embodiment of the positioning mechanism for controlling the position of the seat back frame 14. The positioning mechanism includes a housing 120 and a threaded rod 124. The housing 120 has a bifurcated flange 128 which has an elongated aperture 130 therethrough. A pin 34, which is connected to the seat back frame 14 through the structural member 32, is disposed in the aperture 130 for sliding and rotary movement therein to allow a predetermined amount of relative movement between the seat back frame 14 and the housing 120.

The threaded rod 124 is pivotally connected by the rivet 36 to the intermediate frame 26. A bolt or pin 140 extends through the rod 124 to retain a washer 142 on the rod 124. A nut 148 threadedly engages the rod 124. The nut 148 has notches 150 disposed circumferentially thereabout. A pair of bearing elements 152 and 154 are retained in the housing 120 on each side of the nut 148.

A biasing means comprising the spring 144 is disposed in the housing 120 between the washer 142 and the bearing means 152 to resist the movement of the rod 124 out of the housing 120.

An arm 180 is pivotally attached to the housing 120 by the rivet 166. The arm 180 has a cam surface 182 which is engageable with the pin 34. The bifurcated flange 128 has a pair of wings 184 and the end of the arm 180 on which the cam surface 182 is disposed rests between the wings 184. The arm 180 also has a flange 185 which is insertable into one of the notches 150 of the nut 140. When the flange 185 is inserted into a notch 150 of the nut 140, the nut 140 is prevented from rotating. When the nut 140 is prevented from rotating, relative movement is prevented between the housing 120 and the rod 124.

A biasing means comprising the spring 192 is disposed between the housing 120 and the arm 180 to urge the cam surface 182 against the pin 34 and to urge the flange 185 into one of the notches 150.

The arm 180 has an aperture 186 in which a pin 188 is inserted to form a lost motion connection. The pin 188 is connected to the link 190. The link 190 is pivotally connected through the rivet 194 to the lever or handle 196. The handle 196 is mounted on the shaft 172 which is in turn supported by a portion of the seat structure (not shown).

In the operation of the embodiment shown in FIGURES 7 through 10, the seat back frame 14 is normally pivoted relative to the seat frame 12 by manual movement of the lever 196 to move the link 190 which in turn moves the pin 188 against the end of the aperture 186 to pivot the arm 180 thereby removing the flange 185 from a notch 150. With the flange 185 removed from a notch 150 of the nut 140, the nut 140 is free to rotate about and move along the threaded rod 124 to allow relative movement between the housing 120 and the rod 124. However, to move the seat back frame 14 from a reclined position toward an upright seat-forming position without actuating the lever 196, the seat back frame 14 may be moved forward so that the pin 34 engages the cam surface 182 to pivot the arm 180 to remove the flange 185 from a notch 150 thereby to allow the seat back frame 14 to be pivoted from a reclined position toward the upright seat-forming position.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

We claim:

1. A seat assembly comprising; a seat frame, a seat back frame operably connected to said seat frame for pivotal movement relative thereto between an upright seat-forming position and various reclined positions, a positioning mechanism interconnecting said seat frame and said seat back frame including manually actuatable control means for selectively allowing relative pivotal movement between said seat frame and said seat back frame, and release means engageable with said seat back frame and operable with said control means for allowing said seat back frame to be moved from a reclined position toward said upright seat-forming position without manual actuation of said control means.

2. A seat assembly comprising; a seat frame, a seat back frame operably connected to said seat frame for pivotal movement relative thereto between an upright seat-forming position and various reclined positions, first means pivotally connected to said seat back frame through a lost motion connection, second means movable relative to said first means and operably connected to said seat frame for pivotal movement relative thereto, control means interconnecting said first and second means for selectively allowing relative movement therebetween to allow relative movement between said seat back frame and said seat frame, and release means engageable with said seat back frame and operable with said control means upon movement allowed by said lost motion connection of said seat back frame in an upright seat-forming direction for allowing said seat back frame to be moved from a reclined position toward said upright seat-forming position.

3. A seat assembly as set forth in claim 2 wherein said second means comprises a rod operatively connected to said seat frame, and said control means is mounted on said first means and movable along said rod for selectively allowing said first means to move along said rod.

4. A seat assembly as set forth in claim 3 wherein said release means is mounted on said first means, and including first biasing means to urge said release means into engagement with said seat back frame.

5. A seat assembly as set forth in claim 4 wherein said lost motion connection is defined by an elongated aperture in said first means and a portion of said seat back frame projecting thereinto for movement therein to allow a predetermined amount of relative movement between said first means and said seat back frame, second biasing means disposed between said first means and said rod to urge relative movement between said rod and said first means in a first direction and to resist relative movement therebetween in the opposite direction, said first biasing means disposed to urge said release means into engagement with the projecting portion of said seat back frame so that upon relative movement between said seat back frame and said first means, said release means will be moved to allow said first means to move relative to said rod in said first direction thereby allowing said seat back frame to move from a reclined position to said upright seat forming position.

6. A seat assembly comprising; a seat frame, a seat back frame operably connected to said seat frame for pivotal movement relative thereto between an upright seat-forming position and various reclined positions, a housing having a flange with an elongated aperture therein, a pin attached to said seat back frame and disposed for sliding and rotary movement in said aperture to allow a predetermined amount of relative movement between said housing and said seat back frame, a rod disposed for movement in and out of said housing, said rod being operably connected at a first end thereof to said seat frame for pivotal movement relative thereto, control means operatively mounted in said housing and movable along said rod for selectively allowing said housing to move relative to said rod, first biasing means in said housing and disposed between said housing and the second end of said rod, and release means movably mounted on said housing and biased into engagement with said pin and operable with said control means to allow movement of said housing relative to said rod upon relative movement between said seat back frame and said housing.

7. A seat assembly comprising: a seat frame; a seat back frame operably connected to said seat frame for pivotal movement relative thereto between an upright seat-forming position and various reclined positions; first means pivotally connected to said seat back frame through a lost motion connection; second means movable relative to said first means and operably connected to said seat frame for pivotal movement relative thereto; control means operatively interconnecting said first and second means for selectively controlling the movement therebetween, said control means including friction means slidable along and normally in frictional engagement with said first means, and means for selectively moving said friction means out of said frictional engagement for allowing said first means to move relative to said second means; and release means movably mounted on said first means and engageable with said friction means upon relative movement between said first means and said seat back frame to allow said seat back frame to move from a reclined position toward said upright seat-forming position.

8. A seat assembly comprising; a seat frame, a seat back frame operably connected to said seat frame for pivotal movement relative thereto between an upright seat-forming position and various reclined positions, a housing having an elongated aperture therein, a pin attached to said seat back frame, said pin being adapted for sliding and rotary movement in said aperture to allow a predetermined amount of relative movement between said housing and said seat back frame, a rod disposed for movement in and out of said housing, said rod being operably connected at a first end thereof to said seat frame for pivotal movement relative thereto, first biasing means disposed between the second end of said rod and said housing, control means operatively mounted in said housing and selectively movable along said rod for allowing said housing to move relative to said rod, release means movably mounted on said housing, second biasing means for urging said release means into engagement with said pin, and said release means being engageable with said control means upon relative movement between said housing and said seat back frame to allow said seat back frame to move from a reclined position toward said upright seat-forming position.

9. A seat assembly as set forth in claim 8 wherein said control means includes friction means slidable along and normally in frictional engagement with said rod, and means for selectively moving said friction means out of said frictional engagement for allowing said housing to move relative to said rod, said release means being engageable with said friction means upon relative movement between said housing and said seat back frame to allow the movement of said seat back frame toward said upright seat forming position.

10. A seat assembly as set forth in claim 9 wherein said friction means includes a plurality of discs normally in frictional engagement with said rod for preventing said housing from moving relative to said rod.

11. A seat assembly as set forth in claim 9 wherein said friction means includes a first disc pack comprising at least one disc normally in frictional engagement with said rod for preventing movement of said housing relative to said rod in a first direction, a second disc pack comprising at least one disc normally in frictional engagement with said rod for preventing movement of said housing relative to said rod in a second direction, third biasing means disposed between said first and second disc packs to urge said disc packs into frictional engagement with said rod, said control means being pivotally connected to said housing for selective movement to engage said first and second disc packs to move same out of frictional engagement with said rod to allow said housing to move relative to said rod, said release means being engageable with said first disc pack upon relative movement between said seat back frame and said housing whereby said pin is moved along said aperture to move said release means for engaging and moving said first disc pack to allow said housing to move relative to said rod thereby allowing said seat back frame to be moved from a reclining position toward said upright seat forming position.

12. A seat assembly as set forth in claim 11 wherein said housing has a bifurcated flange thereon and said aperture is disposed through said flange, said first disc pack being in engagement with said housing on one side of said rod and said second disc pack being in engagement with said housing on the opposite side of said rod, said control means being adapted to engage said first disc pack on the opposite side of said rod from said engagement between said first disc pack and said housing and to engage said second disc pack on the opposite side of said rod from said engagement between said second disc pack and said housing for selectively moving said disc packs out of frictional engagement with said rod to allow said housing to move relative to said rod, said release means being slidably retained in said bifurcated flange, said second biasing means being disposed between said bifurcated flange and said release means to urge said release means into engagement with said pin.

13. A seat assembly comprising: a seat frame; a seat back frame operatively connected to said seat frame for pivotal movement relative thereto between an upright seat-forming position and various reclined positions; a first means pivotally connected to said seat back frame through a lost motion connection; a second means movable relative to said first means and pivotally connected to said seat frame; control means interconnecting said first and second means for selectively allowing movement of said first means relative to said second means; said control means including a nut rotatably mounted on said first means and in threaded engagement with said second means; release means movably mounted on said first means and in normal engagement with said seat back frame and in normal engagement with said nut to prevent rotation thereof; and said release means being operable upon relative movement between said seat back frame and said first means to allow said nut to rotate whereby said seat back frame may move from a reclined position toward said upright seat-forming position.

14. A seat assembly as set forth in claim 13 wherein said first means includes a housing having an elongated aperture therethrough and a pin attached to said seat back frame and extending through said aperture to define said lost motion connection to allow a predetermined amount of relative movement between said seat back frame and said housing, said second means includes a threaded rod disposed for movement in and out of said housing and being operatively connected at one end thereof to said seat frame for pivotal movement relative thereto; first biasing means disposed between the second end of said rod and said housing; said nut being rotatably mounted in said housing and in threaded engagement with said rod; said release means being movably mounted on said housing; second biasing means for urging said release means into engagement with said pin and into engagement with said nut to prevent rotation thereof, said release means operable by said pin upon movement of said pin in said aperture to allow said nut to rotate on said rod whereby said seat back frame may move toward said upright seat forming position.

15. A seat assembly as set forth in claim 14 wherein said nut has notches disposed circumferentially thereabout; said release means includes an arm pivotally attached to said housing and having a cam surface engageable with said pin and a flange insertable in said notches of said nut whereby upon relative movement between said seat back frame and said housing said pin will engage said cam surface to pivot said arm to withdraw said flange from a notch to allow said movement toward said upright seat forming position.

16. A seat assembly as set forth in claim 15 including bearing means retained in said housing on each side of said nut; and linkage means connected to said arm and operable to pivot said arm to withdraw said flange from a notch in said nut, said linkage means being connected to said arm through a lost motion connection so that said linkage means remains stationary when said arm is pivoted by said pin acting on said cam surface.

17. A positioning mechanism for controlling relative movement between first and second members comprising; a first means adapted for a lost motion connection to said first member; a second means movable relative to said first means and adapted for connection to said second member, control means interconnecting said first and second means for selectively allowing relative movement therebetween to allow relative movement between said first and second members, and release means engageable with said first member for operating said control means upon movement allowed by said lost motion connection of said first member in a first direction relative to said first means.

18. A positioning mechanism as set forth in claim 17 wherein said second means includes a rod movable relative to said first means and adapted for connection to said second member, said control means being operatively mounted on said first means and movable along said rod for selectively allowing relative movement therebetween.

19. A positioning mechanism as set forth in claim 18 including biasing means to urge said release means into engagement with said first member so that said release means is engaged and moved by said first member upon movement in a first direction of said first member relative to said means as allowed by said lost motion connection whereby said rod is allowed to move relative to said first means.

20. A positioning mechanism as set forth in claim 19 wherein said first means has an elongated aperture therethrough for receiving a projecting portion of said first member to define said lost motion connection which allows a predetermined amount of relative movement between said first means and the first member, second biasing means disposed between said first means and said rod to urge relative movement between said rod and said first means in a first direction and to resist relative movement therebetween in the opposite direction.

21. A positioning mechanism as set forth in claim 20 wherein said first means includes a housing having a flange with said elongated aperture therein, said control means includes friction means slidable along and normally in frictional engagement with said rod, and means for selectively moving said friction means out of said frictional engagement for allowing said housing to move relative to said rod, said release means being engageable with said friction means upon relative movement between said housing and the first member, said friction means including a first disc pack comprising at least one disc normally in frictional engagement with said rod for preventing movement of said housing relative to said rod in a first direction, a second disc pack comprising at least one disc normally in frictional engagement with said rod for preventing movement of said housing relative to said rod in a second direction, third biasing means disposed between said first and second disc packs to urge said disc packs into frictional engagement with said rod, said control means being pivotally connected to said housing for selective movement to engage said first and second disc packs to move same out of frictional engagement with said rod to allow said housing to move relative to said rod, said release means being engageable with said first disc pack upon relative movement between said first member and said housing to move the projecting portion of said first member along said aperture whereby said release means is moved to engage and move said first disc pack to allow said housing to move relative to said rod.

22. A positioning mechanism as set forth in claim 20 wherein said first means includes a housing having said elongated aperture therethrough, said rod being threaded and disposed for movement in and out of said housing, said first means including a nut rotatably mounted in said housing and in threaded engagement with said rod, said release means coacting with said nut to allow said nut to rotate on said rod.

23. A positioning mechanism as set forth in claim 22 wherein said nut has notches disposed circumferentially thereabout, said release means includes an arm pivotally attached to said housing for engaging said projecting portion of said first member and including a flange insertable in said notches of said nut whereby upon relative movement between said first member and said housing, said projecting portion will engage said arm to pivot the arm to withdraw said flange from a notch in the nut to allow relative movement between the rod and the housing.

References Cited

UNITED STATES PATENTS

| | | | |
|---|---|---|---|
| 2,579,305 | 12/1951 | Cushman | 297—361 |
| 2,596,760 | 5/1952 | Bryant | 297—361 |
| 3,024,067 | 3/1962 | Brandoli | 297—355 |
| 3,046,055 | 7/1962 | Martens | 297—361 |
| 3,062,584 | 11/1962 | Galla | 297—374 |
| 3,133,764 | 5/1964 | Naef | 297—367 |

BOBBY R. GAY, *Primary Examiner.*

FRANK B. SHERRY, *Examiner.*

GLENN O. FINCH, *Assistant Examiner.*